(12) United States Patent
Ohara et al.

(10) Patent No.: US 9,264,565 B2
(45) Date of Patent: Feb. 16, 2016

(54) IMAGE COMMUNICATION APPARATUS, OPERATING METHOD, AND STORAGE MEDIUM WITH POWER SAVING MODE

(71) Applicant: CANON KABUSHIKI KAISHA, Tokyo (JP)

(72) Inventors: Eiji Ohara, Kawasaki (JP); Shigeru Koizumi, Tokyo (JP); Daisuke Suga, Kawasaki (JP); Michio Fukushima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/519,779

(22) Filed: Oct. 21, 2014

(65) Prior Publication Data

US 2015/0172496 A1 Jun. 18, 2015

(30) Foreign Application Priority Data

Dec. 18, 2013 (JP) ................... 2013-261832

(51) Int. Cl.
*G06K 15/00* (2006.01)
*H04N 1/00* (2006.01)

(52) U.S. Cl.
CPC ........ *H04N 1/00904* (2013.01); *G06K 15/4055* (2013.01); *H04N 1/00302* (2013.01); *H04N 2201/0094* (2013.01)

(58) Field of Classification Search
CPC .................................................. H04N 1/00904
USPC ............... 358/408, 409, 413, 426.07, 426.15, 358/426.16, 434–443
See application file for complete search history.

(56) References Cited

U.S. PATENT DOCUMENTS

| | | | |
|---|---|---|---|
| 4,987,591 A * | 1/1991 | Ohtsuka | 379/279 |
| 5,937,069 A | 8/1999 | Nagai et al. | 380/49 |
| 6,353,482 B1 | 3/2002 | Abe et al. | 358/1.15 |
| 7,016,070 B2 * | 3/2006 | Pham | H04N 1/4056 358/1.1 |
| 7,092,113 B1 | 8/2006 | Saito et al. | 358/1.15 |
| 7,139,088 B2 | 11/2006 | Murata et al. | 358/1.15 |
| 7,564,578 B2 | 7/2009 | Saito et al. | 358/1.15 |
| 2002/0114384 A1 * | 8/2002 | Nelson | G06F 8/65 375/222 |
| 2003/0103508 A1 * | 6/2003 | Landaveri | H04L 49/206 370/395.1 |
| 2013/0307240 A1 * | 11/2013 | Petutschnig | B62K 3/002 280/87.042 |
| 2014/0169540 A1 | 6/2014 | Suga et al. | H04M 7/0054 |

FOREIGN PATENT DOCUMENTS

| | | |
|---|---|---|
| JP | 2005-202643 A | 7/2005 |
| JP | 2007-006518 | 1/2007 |

\* cited by examiner

*Primary Examiner* — Marcellus Augustin
(74) *Attorney, Agent, or Firm* — Fitzpatrick, Cella, Harper & Scinto

(57) ABSTRACT

There is provided with an image communication apparatus. A serial interface transfers data between a master and a slave. The master supplies a clock signal to the slave. An oscillation generator generates a clock signal. A switch selects, and supplies to the slave, either the clock signal output from the oscillation generator or the clock signal from the master. A controller stops an operation of the master and controls the switch such that the clock signal output from the oscillation generator is supplied to the slave, upon transition to a power saving mode.

11 Claims, 8 Drawing Sheets

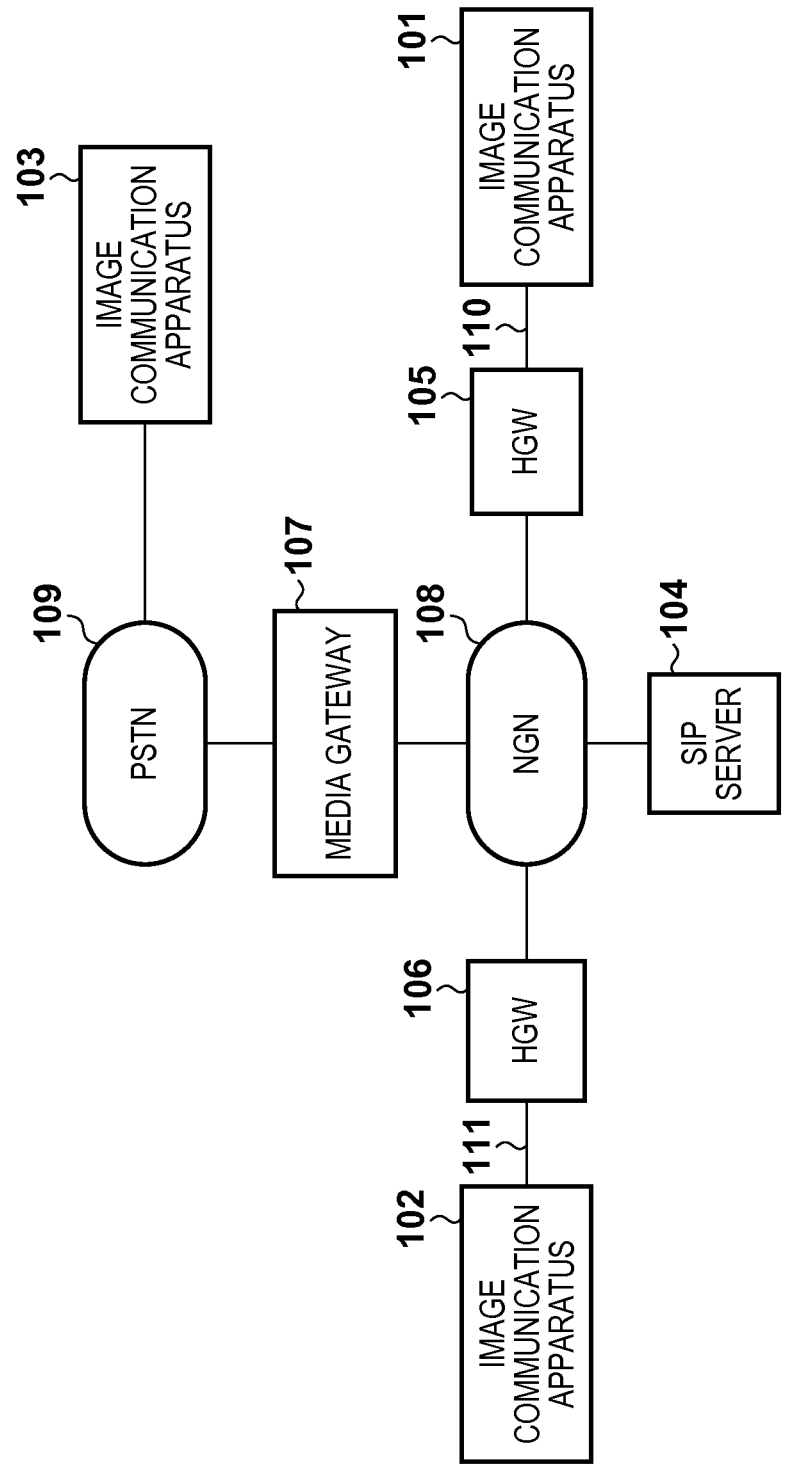

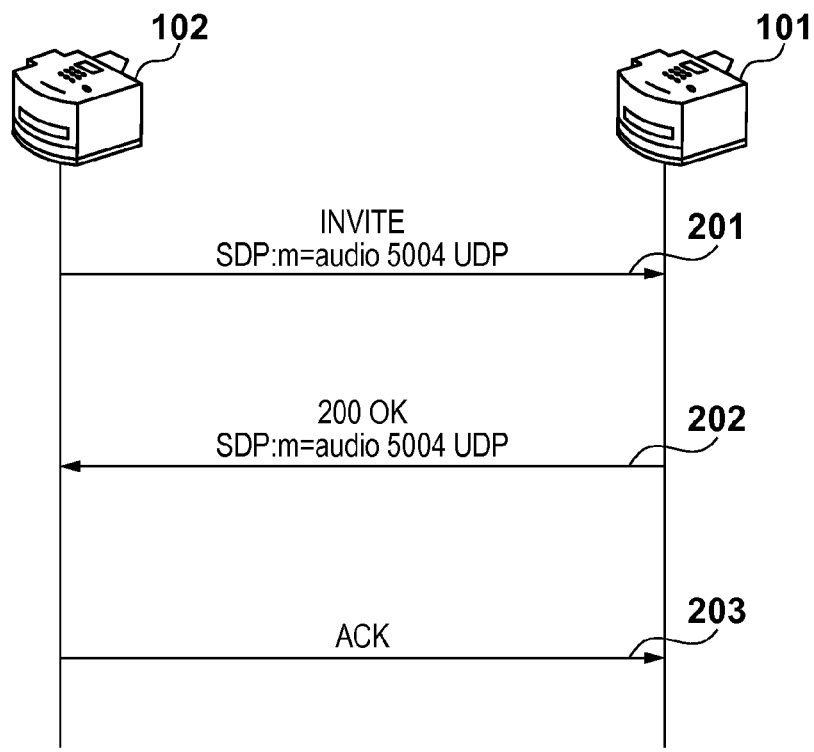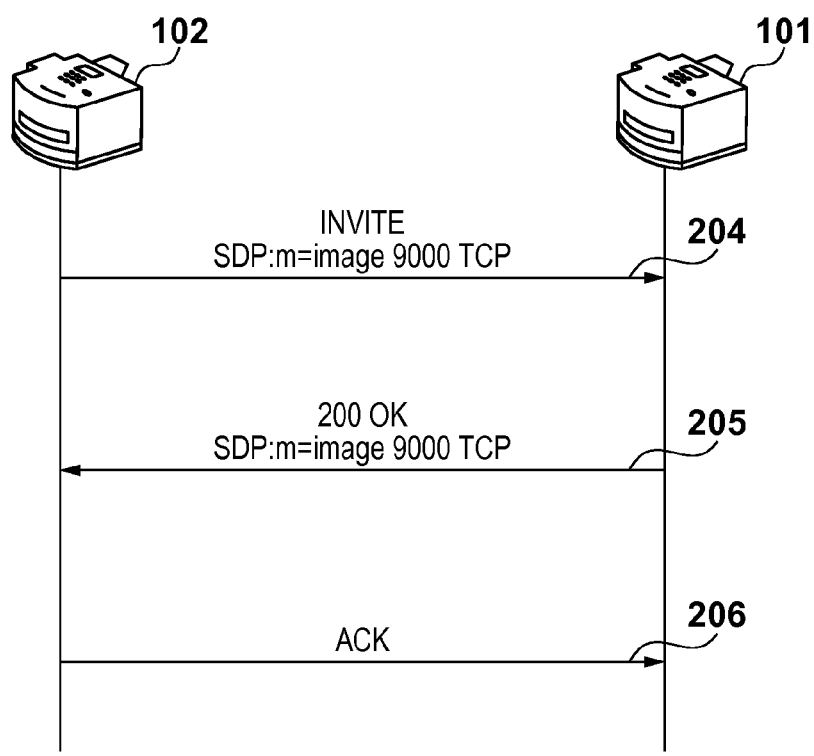

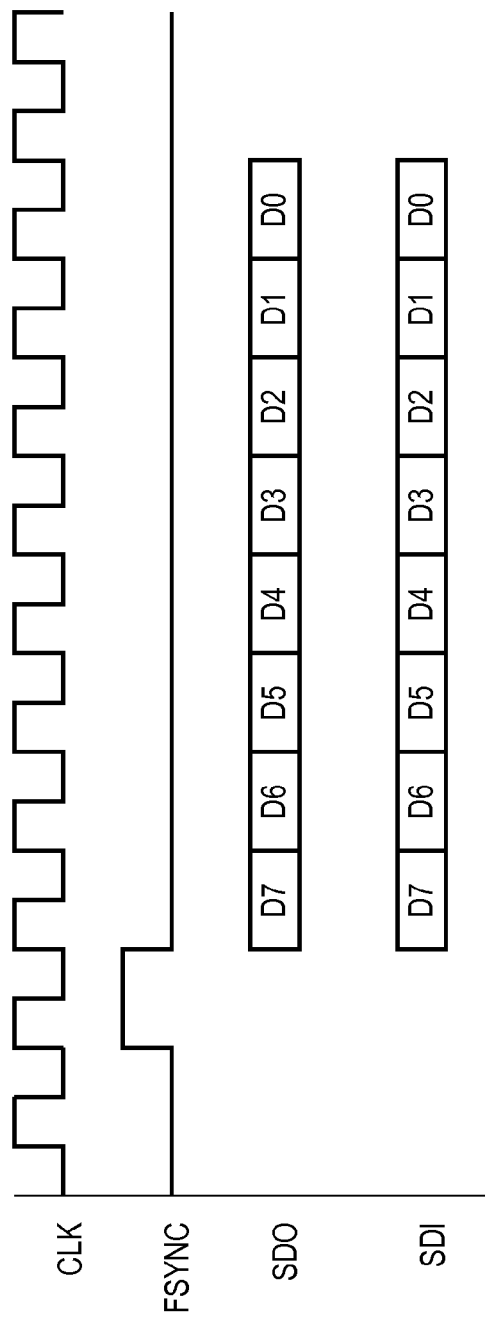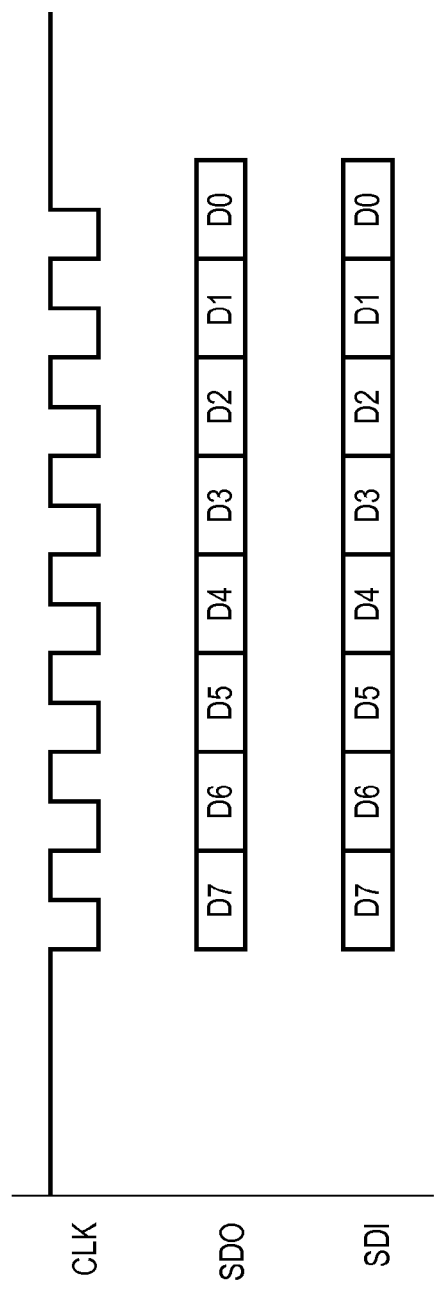

IMAGE COMMUNICATION APPARATUS, OPERATING METHOD, AND STORAGE MEDIUM WITH POWER SAVING MODE

BACKGROUND OF THE INVENTION

1. Field of the Invention

This invention relates to an image communication apparatus, a method of controlling the same, and a storage medium.

2. Description of the Related Art

In recent years, techniques in which a service is provided via a LAN or a next generation network (NGN), having replaced a conventional circuit switched public telephone network with a network based on IP (Internet Protocol) technologies, are widely used. Such NGNs (Next Generation Network) are provided with a bandwidth guaranteeing function and a security function in the network itself, and are IP networks that realize integrally services such as calling, video communication and data communication. Also, usage of an SIP (Session Initiation Protocol) in which a virtual session is established with a LAN or a communication device on an NGN, and a service is provided while the session is established has spread. On a communication device that has established a session by the SIP, a call or an image communication is performed by transferring PCM data with a plurality of PCM interfaces using a protocol such as IP or VoIP (Voice Over IP). With respect to image communication, there exists facsimile communication by ITU-T recommendation T.38 digital facsimile procedure, for example, and facsimile communication by ITU-T recommendation T.30 digital facsimile procedure (T.30 facsimile communication by a VoIP in-band communication).

In such a call or image communication, the transferring of the PCM data is performed by the plurality of PCM interfaces. In the transfer of the PCM data, a synchronous serial bus equipped with a data signal line and a synchronization signal line is used, and a data transfer side and another side are caused to operate as master and slave respectively. In addition, a case, in which transfer of PCM data is performed with a plurality of slaves by selectively switching and connecting the plurality of slaves to a master, is the same in that one side is caused to operate as the master while the other side is caused to operate as the slave, and bidirectional data transmission is performed at a data transfer timing of the master. In Japanese Patent Laid-Open No. 2005-202643, it is recited that a serial data communication is performed by a master in a case where a plurality of slaves are connected to a synchronous serial bus to which the master is connected.

Meanwhile, in this kind of apparatus that performs a call or image communication, in order to realize a power saving in a case where a usage frequency is low, it is common that automatically transitioning into a power saving mode be performed when an interval over which the apparatus does not operate is greater than or equal to a fixed interval. In such a power saving mode, a power supply and a supply of a clock signal to units other than a processing unit which is necessary to continue a function is stopped (for example, refer to Japanese Patent Laid-Open No. 2007-6518). The processing unit necessary to continue the function is, for example, one for an off-hook detection function in the case of a call. Accordingly, after transitioning into the power saving mode, in order to detect an off-hook of a receiver, a power supply and a supply of a clock signal to the processing unit for the off-hook detection is maintained.

SUMMARY OF THE INVENTION

According to an embodiment, an image communication apparatus comprises: a serial interface configured to transfer data between a master and a slave, wherein the master is configured so as to supply a clock signal to the slave; an oscillation generator configured to generate a clock signal; a switch configured to select, and supply to the slave, either the clock signal output from the oscillation generator or the clock signal from the master; and a controller configured to stop an operation of the master and to control the switch such that the clock signal output from the oscillation generator is supplied to the slave, upon transition to a power saving mode.

According to another embodiment, an operation method comprises: selecting and supplying to a slave, either a clock signal output from an oscillation generator or a clock signal from the master, wherein the master is configured so as to supply a clock signal to a slave, and wherein a serial interface transfers data between the master and the slave; wherein the operation of the master is stopped and the clock signal output from the oscillation generator is supplied to the slave, upon transition to a power saving mode.

According to still another embodiment, a non-transitory computer-readable medium stores a program for causing a computer to: select and supply to a slave, either a clock signal output from an oscillation generator or a clock signal from the master, wherein the master is configured so as to supply a clock signal to a slave, and wherein a serial interface transfers data between the master and the slave; wherein the operation of the master is stopped and the clock signal output from the oscillation generator is supplied to the slave, upon transition to a power saving mode.

Further features of the present invention will become apparent from the following description of exemplary embodiments (with reference to the attached drawings).

BRIEF DESCRIPTION OF THE DRAWINGS

FIG. 1 is a view for showing a configuration of a network system according to embodiments of the present invention.

FIGS. 2A-2B are views for explaining sequences upon an SIP session establishment.

FIGS. 5A-5B are views for explaining timing charts of a PCM interface of FIG. 4.

DESCRIPTION OF THE EMBODIMENTS

Figure 3:
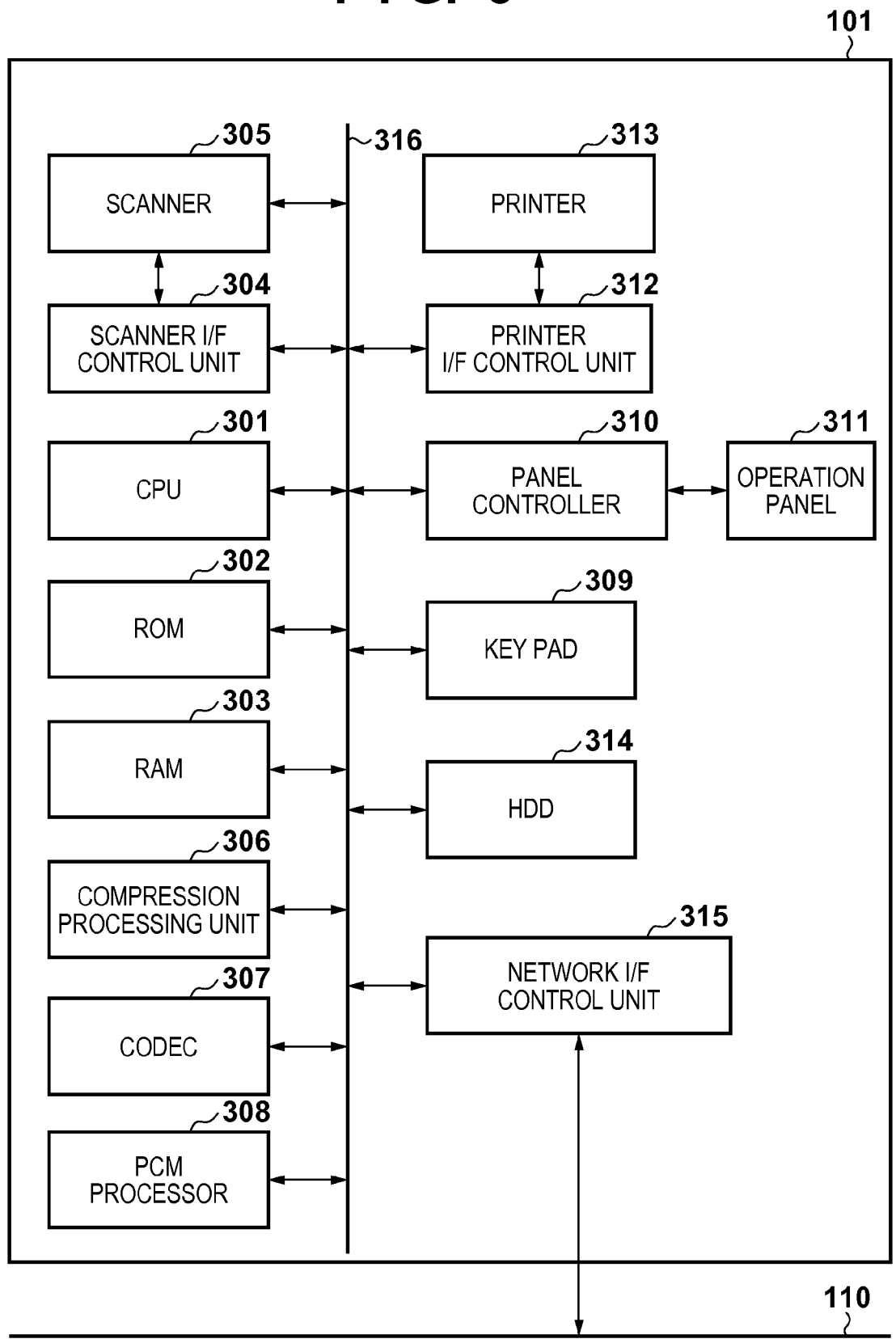
FIG. 3 is a block diagram for showing a hardware configuration of an image communication apparatus according to embodiments.

By a slave of a PCM interface a PCM data transfer is performed using a clock signal supplied from the master. Furthermore, there are cases in which, using a clock signal obtained by multiplication, performed by a PLL circuit, of the clock signal supplied from the master, a function that the slave has other than the PCM data transfer, such as an off-hook detection function, for example, is caused to operate. In such a case, it is necessary for the other function that the slave has, such as the off-hook detection function, for example, to be allowed to continue after the slave has transitioned into a power saving mode. For this reason, it is necessary for the master to continue to supply the clock signal to the slave, and for this reason, there is the problem that the master is not able to transition into the power saving mode.

According to several embodiments, it is possible for the slave to continue to execute necessary processing in the power saving mode even if operation of the master is stopped in the power saving mode.

Embodiments of the present invention will be described hereinafter in detail, with reference to the accompanying drawings. It is to be understood that the following embodiments are not intended to limit the scope of the claims of the present invention, and that not all of the combinations of the aspects that are described according to the following embodiments are necessarily required for the present invention.

In embodiments, explanation will be given regarding a power saving operation of an image communication apparatus that is equipped with an IP facsimile function and an IP telephone function. In particular, explanation will be given for a power saving operation of the image communication apparatus, which has a plurality of synchronous serial interfaces such as a PCM interface for transferring PCM (Pulse Code Modulation) data.

FIG. 1 is a view for showing a configuration of a network system according to embodiments of the present invention.

An NGN 108 is connected to an SIP server 104, home gateways (HGW) 105 and 106, and a media gateway (media GW) 107. The SIP server 104 provides SIP (Session Initiation Protocol) services such as telephone number and IP address conversion for performance of call connection processing in an IP telephone service and an IP facsimile communication. The home gateways 105 and 106 are connected so as to relay between the NGN 108, and image communication apparatuses 101 and 102 respectively. The home gateways 105 and 106 are devices which are interfaces that perform a facsimile communication by a digital facsimile procedure of ITU-T recommendation T.38, and a facsimile communication by the digital facsimile procedure of ITU-T recommendation T.30 (T.30 facsimile communication by a VoIP in-band communication).

The media gateway 107 is installed by a carrier or a network company in order to connect the NGN 108 and a PSTN 109. The media gateway 107, in addition to performing digital/analog conversion of signals (from audio signals to IP packets and vice versa), controls a call toward a subscriber terminal (an audio terminal, or the like) connected to the PSTN 109. An image communication apparatus 103 is a G3 analog facsimile apparatus connected to the PSTN 109, and the image communication apparatus 103 performs facsimile communication by an analog facsimile procedure of ITU-T recommendation T.30.

FIGS. 2A-2B are views for explaining sequences upon an SIP session establishment. Here, explanation will be given regarding the SIP which is for providing a service while an SIP session is established.

FIG. 2A is a view for explaining a sequence in a case where the image communication apparatus 102 according to embodiments desires the establishment of an SIP session with the image communication apparatus 101. Here, the image communication apparatus 102 transmits an SIP connection request message (INVITE) including an SDP (Session Description Protocol) offer to the image communication apparatus 101.

Firstly, in reference numeral 201, the image communication apparatus 102 transmits the INVITE message to the image communication apparatus 101. In this INVITE message, an SDP, in which media information and a reception port number that are desired to be used in the SIP session, are described, is included.

Here, by describing m=audio 5004 UDP as a target of the call, the image communication apparatus 102 proposes to establish an SIP session for performing data communication, using a media type (audio) and UDP port number "5004". When the image communication apparatus 101 receives the INVITE message, the destination of which is the image communication apparatus 101, the image communication apparatus 101 examines the SDP offer included in the INVITE message. Then, if media information that the image communication apparatus 101 is capable of supporting is described in the INVITE message, a 200 OK message is transmitted to the image communication apparatus 102 (reference numeral 202). Note that an SDP, that describes media information that the image communication apparatus 101 accepts (audio) and a reception port number (5004), is included in the 200 OK message. In this embodiment, m=audio 5004 UDP is described. Thus, the image communication apparatus 101 consents to establishing an SIP session for performance of data communication with a media type of audio and a reception port of UDP port number "5004".

When the image communication apparatus 102 receives the 200 OK message, the image communication apparatus 102 transmits an ACK message indicating that the 200 OK message is received in reference numeral 203. With this, an SIP session that realizes data communication of audio media information between the image communication apparatus 102 and the image communication apparatus 101, which is consented to by both parties, is established. Note that it is possible to establish a session for a media type other than the previously described audio.

FIG. 2B is a view for explaining a sequence for a case where the image communication apparatus 102 according to embodiments transmits an SIP connection request message (INVITE) including an SDP offer to the image communication apparatus 101, desiring an establishment of another SIP session.

In reference numeral 204, the image communication apparatus 102 transmits the INVITE message to the image communication apparatus 101. In this INVITE message the SDP, in which the media information and the reception port number that are desired to be used in the SIP session are described, is included. Here, as a target of image communication, m=image 9000 TCP is described. Here, the image communication apparatus 102 proposes establishing an SIP session for performing data communication, using an image media type and TCP port number "9000". When the image communication apparatus 101 receives the INVITE message, the destination of which is the image communication apparatus 101, the image communication apparatus 101 examines the SDP offer included in the INVITE message. Then, if media information that the image communication apparatus 101 is capable of supporting is described in the INVITE message, a 200 OK message is transmitted to the image communication apparatus 102 in reference numeral 205. Note that an SDP, that describes media information that the image communication apparatus 101 accepts (image) and a reception port number (9000), is included in the 200 OK message. In this embodiment, m=image 9000 TCP is described. Thus, the image communication apparatus 101 consents to establishing an SIP session for performing data communication with a media type of image and a reception port of TCP port number "9000".

In this way, when the image communication apparatus 102 receives the 200 OK, the image communication apparatus 102 transmits an ACK message indicating that the 200 OK message is received to the image communication apparatus 101 at reference numeral 206. With this, an SIP session that realizes data communication of image media information between the image communication apparatus 102 and the image communication apparatus 101, which is consented to by both, is established.

In this way, as in FIG. 2A, for example, when an SIP session is established for the audio media type, an audio call becomes possible, and a VoIP mode facsimile communication by the T.30 facsimile procedure transmitted as in-band communication becomes possible.

Also, as in FIG. 2B, when an SIP session is established for the image media type, a facsimile communication by a T.38 digital facsimile procedure becomes possible.

FIG. 3 is a block diagram for showing a hardware configuration of the image communication apparatus 101 according to embodiments. Note that the hardware configuration of the image communication apparatus 102 is the same as the hardware configuration of the image communication apparatus 101, and so explanation is omitted.

A CPU 301 performs overall control of the image communication apparatus in accordance with programs stored in a ROM 302, which is a read only memory. Also, the CPU 301 performs TCP/IP protocol processing, and assembly of image data TCP/IP frames is performed by control of the CPU 301. A RAM 303 is a random access memory, and is used as a work memory upon program execution, and is also used for buffering of image data that is transmitted. A scanner I/F control unit 304 controls operation of a scanner 305, and converts image data of an original output from the scanner 305 into digital data; that digital data is transferred to the RAM 303 under the control of the CPU 301, and transmitted or printed. A compression processing unit 306 is an encoding and decoding processor for MH, MR, MMR or JBIG formats, for example, and upon transmission of image data, the compression processing unit 306 encodes image data obtained from the scanner 305, and performs data compression. Also, upon reception, the compression processing unit 306 decodes encoded image data. A CODEC 307 at least supports encoding/decoding modes necessary for transmission of a T.38 Internet facsimile signal. A PCM processor 308, as will be explained later, supports encoding/decoding formats for VoIP for audio signals and facsimile signals transmitted as in-band communication.

A key pad 309 includes a dial, an operation button for transmission of a facsimile, and the like, and the key pad 309 accepts operation instructions by a user. Also, a panel controller 310 controls an operation panel 311 which performs display of various information, and processes instruction input from a user. A printer I/F control unit 312 controls a printer 313, which is of a recording system such as, for example, an electrophotographic printing system or an ink-jet system. The printer I/F control unit 312 prints by converting received (alternatively, input by another approach) image data into raster data for printing, and outputting the raster data to the printer 313. An HDD 314 is a hard disk drive, which is used for storage of various data such as storage of print data. A network I/F control unit 315 is a LAN controller, which performs data transmission via CSMA/CD interfaces 110 and 111 with the home gateways 105 and 106. When the network I/F control unit 315 receives data to be transmitted, the network I/F control unit 315 transmits the data to the CSMA/CD interface 110 having added a MAC (Media Access Control) frame header, an FCS, or the like. A bus 316 connects the CPU 301, the RAM 303, the compression processing unit 306, the CODEC 307, the PCM processor 308, the network I/F control unit 315, or the like, and transfers control signals and data signals from the CPU 301.

Figure 4:
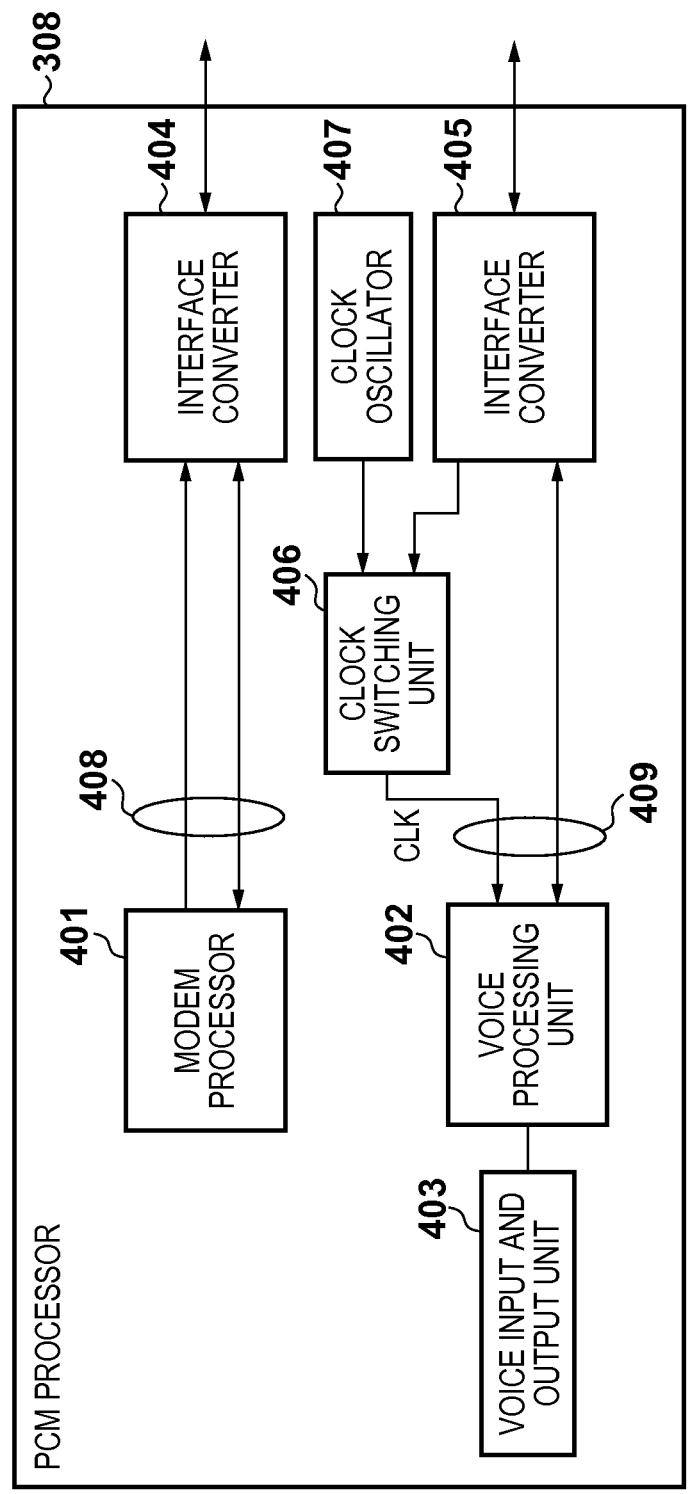
FIG. 4 is a block diagram for showing a configuration of a PCM processor according to embodiments.

FIG. 4 is a block diagram for showing a configuration of the PCM processor 308 according to embodiments.

A modem processor 401 modulates encoded image data upon transmission, converts the result into PCM data which is a digital signal in a voice frequency band, and outputs the result to an interface converter 404. In addition, upon reception, the modem processor 401 demodulates PCM data, which is a received digital signal in the voice frequency band, and outputs encoded image data. A voice input and output unit 403 is a telephone or a handset that performs input and output of audio. A voice processing unit 402, upon transmission, converts an analog voice signal from the voice input and output unit 403 into PCM data, which is a digital audio signal in the voice frequency band, and outputs the result to an interface converter 405. Also, upon reception, the voice processing unit 402 converts PCM data, which is a received digital audio signal in the voice frequency band, into an analog voice signal, and outputs the result to the voice input and output unit 403. These digital audio signals in the voice frequency band are PCM data which supports encoding/decoding formats for VoIP for audio signals or facsimile signals transmitted as in-band communication. Each of the interface converters 404 and 405 adapt the bus 316 (FIG. 3), which is a system bus, to PCM interfaces 408 and 409 of the modem processor 401 and the voice processing unit 402 respectively, and perform interface conversion in order to perform data transmission and receiving.

A clock switching unit 406 performs a switching of a clock signal supplied to the voice processing unit 402, selecting either a clock signal from the interface converter 405 or a clock signal generated by a clock oscillator 407 and supplying the selected signal to the voice processing unit 402. The clock switching unit 406, upon normal operation performs a transfer of PCM data by selecting the clock signal from the interface converter 405. On the other hand, after transition into the power saving mode, the clock signal generated by the clock oscillator 407 is selected. With this, it is possible to decouple the voice processing unit 402 from the interface converter 405 in the power saving mode. Because of this, it is possible, in the power saving mode, to continue a function of the voice processing unit 402 even in a state in which the interface converter 405 has transitioned into the power saving mode.

In this embodiment, after having transitioned into the power saving mode, the clock signal generated by the clock oscillator 407 is supplied to the voice processing unit 302 via the clock switching unit 406. However, configuration may also be taken such that in a case where another clock oscillator that the image communication apparatus 101 has continues to oscillate upon transition into power saving operation, that clock signal is supplied to the voice processing unit 302. Because of this, it is possible to supply a clock signal to the voice processing unit 402 via the clock switching unit 406 in the power saving mode even without providing the clock oscillator 407.

In this way, in the image communication apparatus according to embodiments, the clock signal from the interface converter 405 becomes unnecessary after transition into the power saving mode. Because of this, it is possible to return to a normal power supply state upon an off-hook of the telephone, for example, even when the clock signal from the connected master is not supplied, for example, when in the power saving mode. Thus, it is possible for the connected master to transition into the power saving mode as well.

FIGS. 5A and 5B are views for explaining timing charts of the PCM interfaces 408 and 409 of FIG. 4. The PCM interfaces are interfaces for performing a synchronous serial transfer, and in FIG. 5A and FIG. 5B explanation will be given for two examples.

FIG. 5A illustrates a case of a total of 4 signal lines: two timing signals of a clock signal (CLK) and a synchronization signal (FSYNC); and data signals of data input (SDI) and data output (SDO). Regarding the PCM interfaces 408 and 409, one side in the PCM interfaces is a master and the other is a slave. The clock signal (CLK) and the synchronization signal (FSYNC) are timing signals that the master supplies to the slave, and the master determines the timing of data transfer in the PCM interface.

In FIG. 5A, it is shown that a data signal starts upon a second rising edge of the clock signal (CLK) from a rising edge of the synchronization signal (FSYNC). Continuing from there on, it is shown that, for example, eight data inputs (SDI), and data outputs (SDO) are valid data signals.

FIG. 5B illustrates a case of a total of 3 signal lines: one timing signal of a clock signal (CLK); and two data signals of data input (SDI) and data output (SDO).

Regarding the PCM interfaces 408 and 409, one side in the PCM interfaces is a master and the other is a slave. The master supplies the clock signal (CLK) to the slave, and the master determines the transfer timing of the PCM interface. Here, it is shown that the data signal starts from the first falling edge when the clock signal (CLK) changes. Continuing from there on, it is shown that, for example, eight data inputs (SDI), and data outputs (SDO) are valid data signals.

The PCM interfaces 408 and 409 are not limited to this, and may be generic synchronous serial interfaces. For example, a synchronous serial transfer having a chip select (CS) in place of the synchronization signal (FSYNC), or a TDM (Time Division Multiplexing) synchronous serial transfer for performing the transfer of a plurality of data items time-divisionally may be used.

Also, the interface converters 404 and 405 may convert to another interface and are not limited to the system bus 316. For example, the interface converters 404 and 405 may convert to an asynchronous serial interface such as a UART that performs an asynchronous serial transfer and is a general-purpose interface of the CPU 301.

Figure 6:
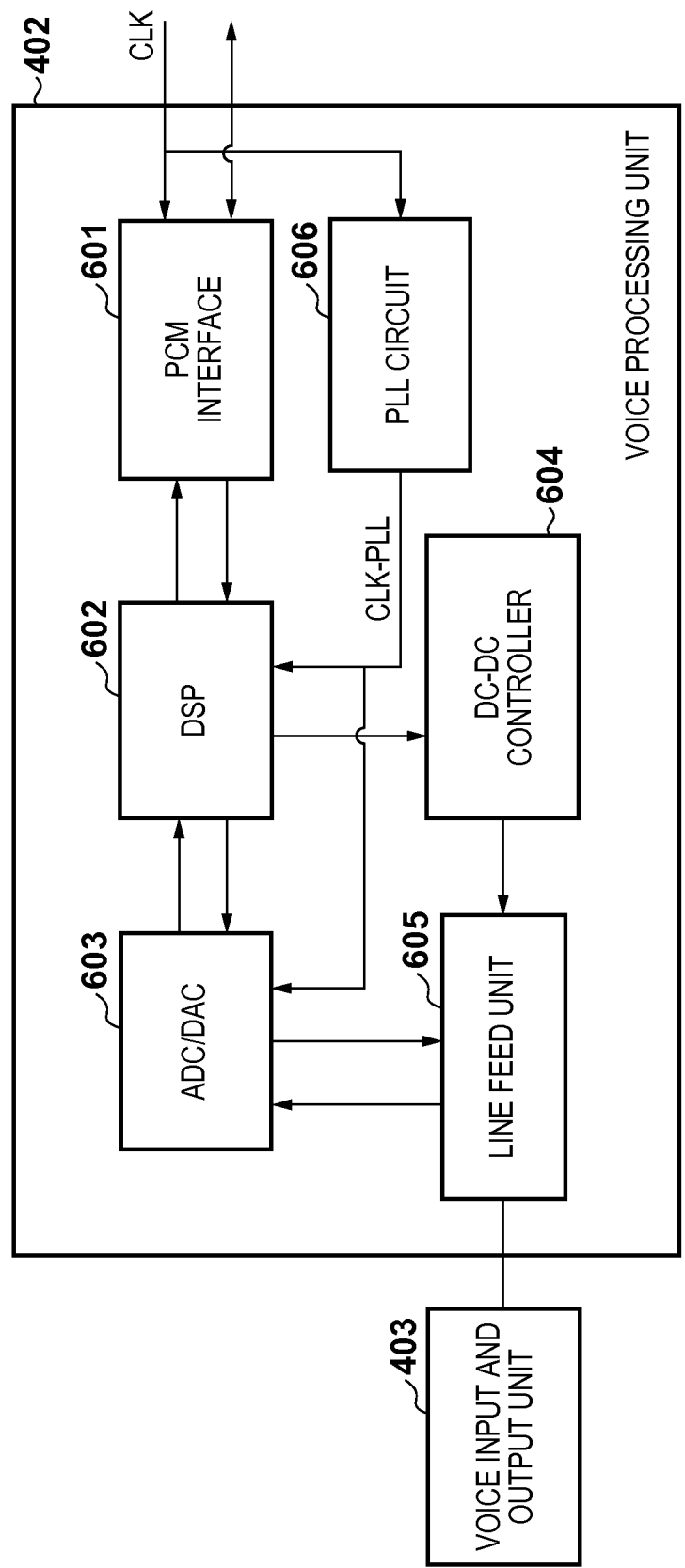
FIG. 6 is a block diagram for explaining a configuration of an audio processing unit according to embodiments.

FIG. 6 is a block diagram for explaining a configuration of the voice processing unit 402 according to embodiments.

A PCM interface 601 is an interface processing unit for performing the previously described synchronous serial transfer, and performing a PCM data transfer between the voice processing unit 402 and the interface converter 405. A DSP 602 is a signal processing unit for performing various digital signal processing. Here, for example, upon transmission, an analog voice signal from the voice input and output unit 403 is converted into PCM data, which is a digital signal in the voice frequency band, via an ADC/DAC 603. Also, upon reception, PCM data, which is a received digital signal in the voice frequency band, is converted into analog audio, via the ADC/DAC 603, and the result is output to the voice input and output unit 403. The ADC/DAC 603 is a signal conversion processing unit that converts analog signals into digital signals, or converts digital signals into analog signals.

A DC-DC controller 604, under the control of the CPU 301, generates a DC voltage that can be changed programmably according to an instruction from the DSP 602, and supplies the result to the voice input and output unit 403 via a line feed unit 605. For example, in a case where the operating state of the voice input and output unit 403 is on-hook, an on-hook voltage is supplied from the DC-DC controller 604 in order to detect a current resulting from circuit close upon an off-hook being performed by the voice input and output unit 403. The line feed unit 605 is an interface processing unit for exchanging analog voice signals and on-hook voltages between lines of the voice processing unit 402 and the voice input and output unit 403. A PLL (Phase Locked Loop) 606 is widely used, has a PD (Phase Detector) circuit, an LPF circuit, a VCO circuit, a frequency dividing circuit, or the like, and outputs a multiplied clock signal in synchronization with an input clock signal.

Here, the PLL circuit 606 inputs a clock signal (CLK) input from the clock switching unit 406. Then, the PLL 606 generates a clock signal (CLK-PLL) that synchronizes with the clock signal (CLK) and multiplies that clock signal, and the PLL 606 supplies the result to processing units such as the DSP 602 and the ADC/DAC 603, causing them to operate. Also, the PLL circuit 606, under the control of the CPU 301, is capable of outputting a clock signal that is not in synchronization with an inputted clock signal. In such a case, the VCO circuit performs a free-running operation, and supplies a clock signal necessary for causing a function other than the PCM data transfer of the voice processing unit 402 to operate.

Figure 7:
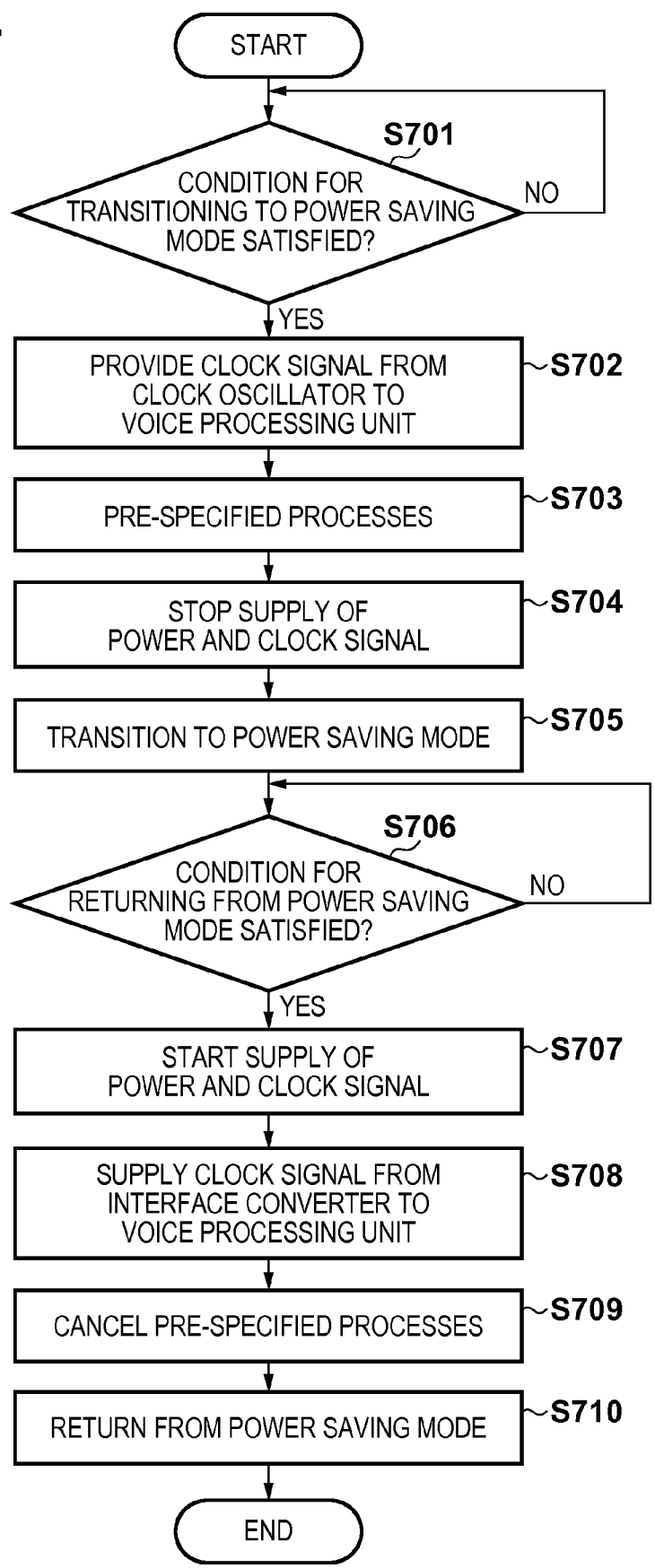
FIG. 7 is a flowchart for describing processing for transition into the power saving mode and for returning from the power saving mode in the image communication apparatus according to the embodiment.

FIG. 7 is a flowchart for describing processing for transition to the power saving mode and for returning from the power saving mode in the image communication apparatus 101 according to the embodiment. Note, a program for executing this processing is stored in the ROM 302, and the processing illustrated by this flowchart is realized by the CPU 301 executing this program. Here, explanation will be given for an example of power saving operation processing in the image communication apparatus 101 in which, in a case where a call or an image communication is not operating, the power saving mode is transitioned into, and in a case where a call or an image communication is caused to operate, normal operation is returned to.

Firstly, in step S701, the CPU 301 determines whether or not an interval, over which no call or image communication has operated, has reached a predetermined interval. Here, in a case where it is determined that the interval, over which no call or image communication has been operating, has reached the predetermined interval, the condition for transitioning to the power saving mode is determined to be satisfied, and the processing proceeds to step S702. In step S702, the CPU 301, controlling the clock switching unit 406, switches such that rather than the clock signal from the interface converter 405, the clock signal output from the clock oscillator 407 is supplied to the voice processing unit 402. With this, thereafter, the voice processing unit 402 is able to continue to operate by the clock signal from the clock oscillator 407. In this way, the DSP 602 of the voice processing unit 402 continues to supply the on-hook voltage to the voice input and output unit 403 via the DC-DC controller 604 so that the current resulting from circuit close can be detected upon the operating state of the voice input and output unit 403 becoming off-hook.

Next, the processing proceeds to step S703, and the CPU 301 sets pre-specified processes for the voice processing unit 402 in order to set the operation of the voice input and output unit 403 upon transition into the power saving mode. These set whether to perform silent output or whether to perform DT (Dial Tone) output for a receiver, or the like, in a case where upon transition to the power saving mode, for example, an off-hook is performed on the voice input and output unit 403. In this way, an off-hook detecting operation of the voice input and output unit 403 necessary for a function to continue in the power saving mode is executed by the clock signal from the clock oscillator 407, and the interface converter 405 is not involved.

Next, the processing proceeds to step S704, and the CPU 301 stops the power supply and the supply of clock signal to processing units for which it is not necessary to continue the function in the power saving mode. In this way, in step S705, the image communication apparatus 101 transitions into power saving operation in the power saving mode.

The power saving operation includes the stopping of the power supply and the supply of clock signal to not only the modem processor 401 and the interface converters 404 and 405, but also to the processing units in the configuration shown in FIG. 3 for which it is not necessary to continue the function upon operation in the power saving mode.

Next, in step S706, the CPU 301, determines whether or not a condition for returning from the power saving mode, which causes a return to normal operation, is satisfied in order to perform operation of a call or an image communication, or the like. Here, in a case where it is determined that the condition for returning is satisfied, the processing proceeds to step S707, and processing for returning to normal operation is started. Note, this condition for returning may be a case in which a user performs an off-hook of the voice input and output unit 403, for example, a case in which a user operates the operation panel 311, or a case in which a job is received via the network I/F control unit 315.

In step S707, the CPU 301 returns processing units, that were stopped because they were not required to continue the function in the power saving mode, to the state they were in before transition into the power saving mode by causing the power supply and the supply of clock signal to start. Next, the processing proceeds to step S708, and the CPU 301, controlling the clock switching unit 406, switches so that the clock signal from the interface converter 405 is supplied to the voice processing unit 402. Also, in step S709, the CPU 301 executes cancellation processing of the previously described pre-specified processes settings, which were set upon transition into the power saving mode in step S703, so as to return the pre-specified process settings to settings such as a silent setting. Then the processing proceeds to step S710, and the CPU 301 causes the image communication apparatus 101 to return from the power saving mode to the normal operation mode.

Note that the pre-specified process settings perform processing in advance such that noise generated in the process of the return processing of the power supply or the clock signal cannot be heard when an off-hook is performed on the receiver of voice input and output unit 403 in a case where a certain return interval is necessary for returning from the power saving mode.

Meanwhile, there are cases in which, depending on the return interval for returning from the power saving mode, the influence of the noise generated in the process of the return processing for the power supply or the clock signal is small, and instead it is desired that notification that an off-hook was performed on the receiver be performed quickly. In such a case, settings for performing processing in advance such as outputting a DT (Dial Tone) are included.

In this way, by virtue of the present embodiment, a clock signal from a built-in clock oscillator is used in the power saving mode as a clock signal for detecting that a condition for returning from the power saving mode occurred. With this, in the state of the power saving mode, it is possible to execute necessary processing in the power saving mode, even in a case where a supply of the clock signal from the master has stopped. With this, in the power saving mode, when an off-hook, an operation of a user from the operation panel 311, or the like, is detected, a return to the normal mode from the power saving mode can be performed immediately.

Figure 8A:
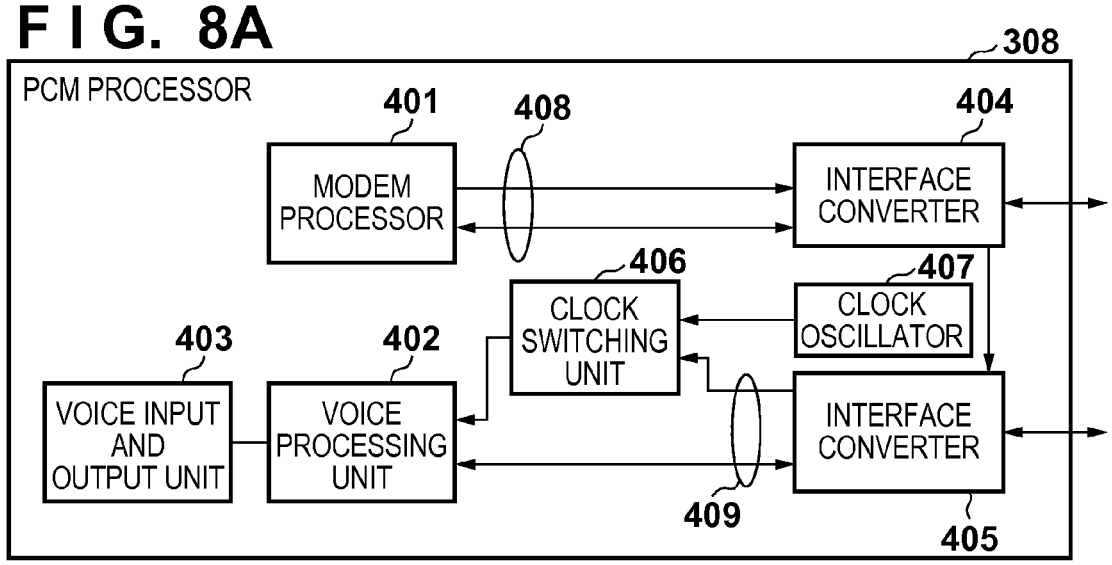
FIGS. 8A-8C are block diagrams for explaining configurations of the PCM processor according to other embodiments of the present invention.
Figure 8B:
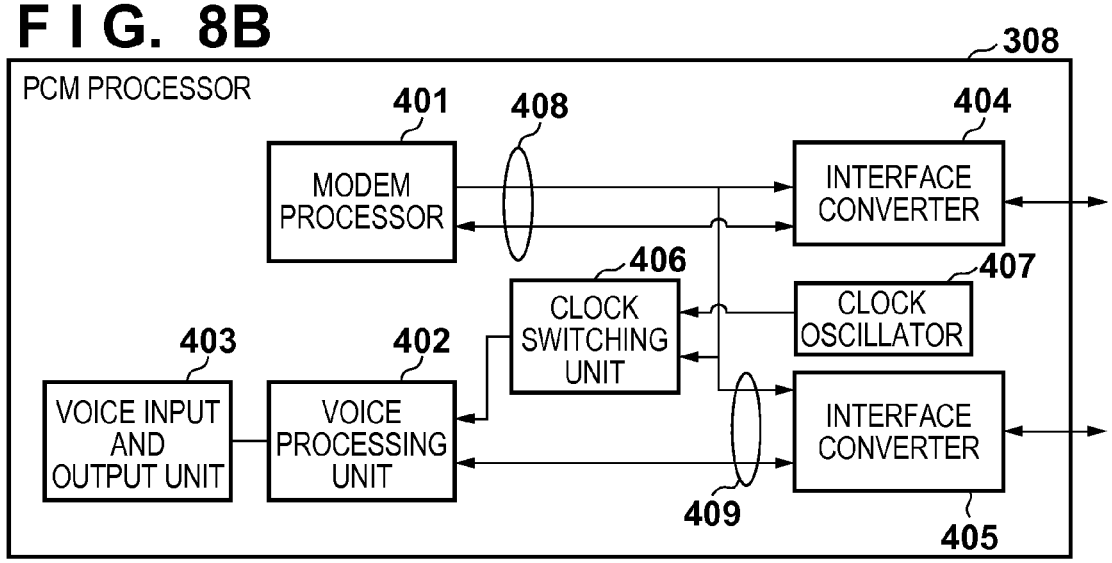
Figure 8C:
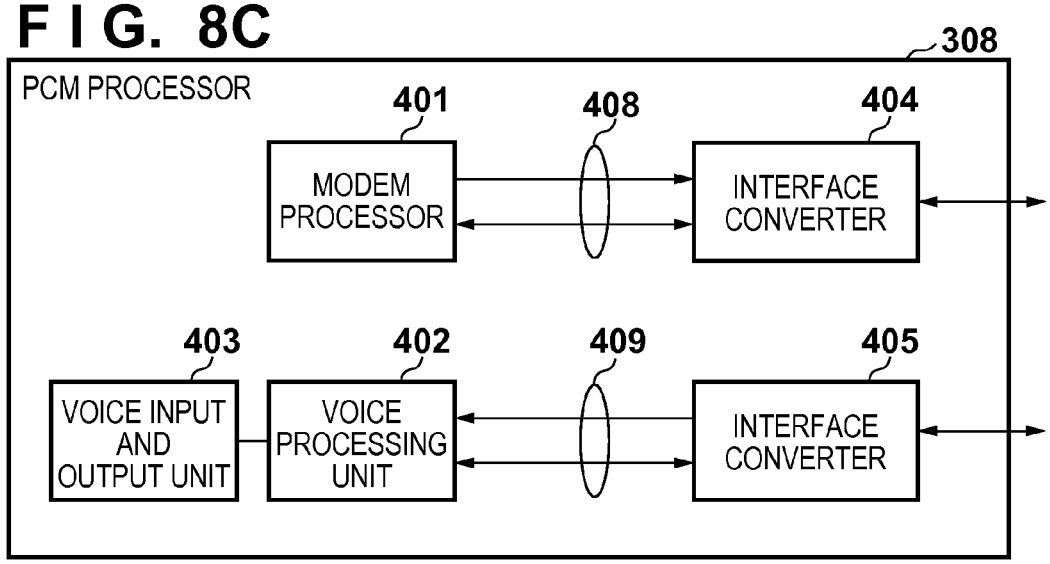

FIGS. 8A-8C are block diagrams for explaining configurations of the PCM processor 308 according to other embodiments of the present invention.

FIG. 8A is different to FIG. 4 in that a clock signal or a timing signal, which is a synchronization signal, for example, is supplied from the interface converter 404 to the interface converter 405. In such a case, in the PCM interface 408, the modem processor 401, as a master, supplies a timing signal to the interface converter 404, which is a slave. With this, the interface converter 404 supplies a timing signal that is synchronized with that timing signal to the interface converter 405.

Furthermore, in the PCM interface 409, the interface converter 405, as a master, supplies a timing signal to the voice processing unit 402, which is a slave. With this, the PCM processor 308 operates in a synchronization relationship with the modem processor 401. Accordingly, the synchronization relationship is simple, and the interface converters 404 and 405 can be configured with a common device. Note that in FIG. 4, one of the PCM interfaces 408 and 409 is the master and the other is the slave, but limitation is not made to this.

FIG. 8B is different to FIG. 4 in that a timing signal used in the PCM interface 408 is supplied to the PCM interface 409 as well, and both perform transfer of data as slaves. Here, because the PCM interfaces 408 and 409 operate in synchronization with the same timing signal, in a case where, for example, the same received signal is transferred, it is possible to transfer to the modem processor 401 and the voice processing unit 402 without considering the timing.

Note, there is an automatic reception operation (a FAX/TEL switching operation) for distinguishing automatically whether a received signal is an audio signal due to a call, or whether the received signal is a facsimile signal received as in-band communication by detecting an existence or absence of a CNG (Calling) signal. While not shown graphically, this corresponds to a case where, for example, data supplied to the voice processing unit 402 is supplied to the modem processor 401, and the audio CNG (Calling) signal is detected by the modem processor 401.

FIG. 8C represents a configuration in which the clock switching unit 406 and the clock oscillator 407 are removed from the configuration of FIG. 4. In this case, the configuration of the voice processing unit 402 is the same as the configuration shown in FIG. 6, but there is a difference in that, in the power saving mode, the PLL circuit 606 does not operate by the clock signal from the interface converter 405. In other words, the PLL circuit 606, under the control of the CPU 301, generates an internal clock signal by causing the VCO circuit of the PLL circuit 606 to perform free-running, and supplies the internal clock signal to the DSP 602 and the ADC/DAC 603. With this, when in the power saving mode, it is possible decouple the interface converter 405 and the voice processing unit 402 in addition to allowing the operation of the voice processing unit 402 to continue.

Note that in FIG. 8A and FIG. 8B, configuration may also be taken such that such that the internal clock signal is generated by causing the VCO circuit of the PLL circuit 606 to perform free-running, and supplying that internal clock signal to the DSP 602 and the ADC/DAC 603.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-261832, filed Dec. 18, 2013, which is hereby incorporated by reference herein in its entirety.

What is claimed is:

1. A communication apparatus, comprising:
    a serial interface configured to transfer data between a master and a slave, the master being configured so as to supply a clock signal to the slave;
    an oscillation generator configured to generate a clock signal;
    a switch configured to select either the clock signal output from the oscillation generator or the clock signal from the master, and supply the selected clock signal to the slave; and
    a controller configured to stop an operation of the master and to control the switch such that the clock signal output from the oscillation generator is supplied to the slave, when the communication apparatus transits to a power saving mode.

2. The communication apparatus according to claim 1, wherein:
    the slave is connected to a telephone or a handset;
    the slave is configured to convert, upon transmission, an analog voice signal from the telephone or the handset into a digital audio signal; and
    the slave is further configured to convert, upon reception, a received digital audio signal into an analog voice signal which the slave outputs to the telephone or the handset.

3. The communication apparatus according to claim 2, wherein the digital audio signal is PCM data.

4. The communication apparatus according to claim 3, wherein the master is an interface converter that controls an interface between the controller and the PCM data.

5. The communication apparatus according to claim 3, further comprising a first serial interface, wherein a master of the first serial interface is a modem processor, and a slave of the first serial interface is an interface converter that controls an interface between the controller and the PCM data.

6. The communication apparatus according to claim 1, wherein the controller is further configured to control the switch to stop supplying the clock signal output from the master to the slave, and to control the switch to start supplying the clock signal output from the oscillation generator to the slave, when the communication apparatus transits to the power saving mode.

7. The communication apparatus according to claim 1, wherein the clock signal generated from the oscillation generator enters the slave without traveling through the master.

8. A communication apparatus, comprising:
    a serial interface configured to transfer data between a master and a slave, the master being configured so as to supply a clock signal to the slave;
    an oscillation generator configured to generate a clock signal; and
    a controller configured to control so as to, when the communication apparatus transits to a power saving mode, cause an operation of the master to stop, and cause the slave to generate a clock signal.

9. The communication apparatus according to claim 8, wherein the slave has a PLL circuit, and the clock signal is generated by a free-running of a VCO circuit of the PLL circuit.

10. A control method for controlling a communication apparatus, comprising:
    transferring, by a serial interface, data between a master and a slave, the master being configured so as to supply a clock signal to the slave;
    selecting either a clock signal output from an oscillation generator or a clock signal from the master, and supplying the selected clock signal to the slave;
    wherein the operation of the master is stopped and the clock signal output from the oscillation generator is supplied to the slave, when the communication apparatus transits to a power saving mode.

11. A non-transitory computer-readable medium storing a program for controlling a communication apparatus, the program comprising:
    code to transfer, by a serial interface, data between a master and a slave, the master being configured so as to supply a clock signal to the slave;
    code to select either a clock signal output from an oscillation generator or a clock signal from the master, and supplying the selected clock signal to the slave;
    wherein the operation of the master is stopped and the clock signal output from the oscillation generator is supplied to the slave, when the communication apparatus transits to a power saving mode.

* * * * *